United States Patent [19]
Meyers

[11] Patent Number: 5,731,914
[45] Date of Patent: Mar. 24, 1998

[54] ZOOM LENS

[75] Inventor: Mark M. Meyers, Hamlin, N.Y.

[73] Assignee: Eastman Kodak Company, Rochester, N.Y.

[21] Appl. No.: 639,652

[22] Filed: Apr. 29, 1996

[51] Int. Cl.$^6$ ........................................ G02B 3/08
[52] U.S. Cl. ............................... 359/742; 359/683
[58] Field of Search ........................ 359/683, 686, 359/687, 688, 689, 690, 691, 692, 740, 741, 742

[56] References Cited

U.S. PATENT DOCUMENTS

| | | |
|---|---|---|
| 4,812,023 | 3/1989 | Kikuchi ........................ 359/689 |
| 5,013,133 | 5/1991 | Buralli et al. ................. 350/162.11 |
| 5,078,513 | 1/1992 | Spaulding et al. ............. 385/14 |
| 5,260,833 | 11/1993 | Ito et al. ....................... 359/689 |
| 5,268,790 | 12/1993 | Chen ............................. 359/558 |
| 5,353,160 | 10/1994 | Ogata ............................ 359/689 |

Primary Examiner—David C. Nelms
Assistant Examiner—Dawn-Marie Bey
Attorney, Agent, or Firm—Svetlana Z. Short

[57] ABSTRACT

A wide angle zoom lens suitable for use in cameras for providing sufficiently wide range of field angles to cover a frame of a film in the camera provides performance comparable to zoom lenses having more elements. The wide angle zoom lens has four elements in three groups which are moveable with respect to each other. The front group has a diffractive lens formed on a curved surface thereof. The second or intermediate group and the front group has surfaces are aspheres for aberration correction as does a surface of a single element third group. Chromatic aberration is corrected by the diffractive lens in combination with the lens of the other groups over the zoom range. The third group lens is formed with glass with lower dispersion (higher Abbe number) than the lenses of the other groups. The second group has two lenses one of which may be a low power, negative, meniscus lens which is made of plastic thereby further reducing the cost of the zoom lens.

23 Claims, 7 Drawing Sheets

ZOOM LENS

FIELD OF THE INVENTION

The present invention relates to zoom lenses and particularly to a zoom lens with a diffractive optical focusing element (DOE).

The invention provides a zoom lens which maintains wide field angle coverage in the image or focal plane of the lens over the zooming range. The field angle is equal to twice the angle defined by the tangent of the height of the image at the image plane divided by the focal length of the lens along the optical axis. The wide field angle is sufficient to cover the height of a frame of film disposed in the image plane over the zooming range. A zoom lens provided in accordance with the invention is therefore especially suitable for use in a photographic camera which requires a wide field angle, such as a camera which handles 35 mm film.

BACKGROUND OF THE INVENTION

Zoom lenses capable of imaging over a wide angle are sensitive to aberrations such as coma, spherical operation, astigmatism, Petzval curvature and distortion which increase with field angle. Zoom lenses for photographic applications have needed 7 to 16 elements to achieve acceptable image quality and in order to reduce aberrations, especially near the limits of the field. Each lens surface contributes to flare and scattering of light which degrades image quality, particularly contrast or sharpness as may be measured by the modulation transfer function (MTF) of the lens. MTF is equal to the ratio of the difference to the sum of the maximum and minimum intensity between spaced dark lines across the image plane. MTF also measures image quality in terms of the resolution of the image in the spacing of the lines which can be resolved and the reciprocal of the spacing of the lines which is a measure of the spatial frequency resolution at the image plane.

Increasing the F/# (or decreasing the numerical aperture) can reduce the effect of aberrations, but decreases the speed of the lens thereby making the lens undesirable for many photographic applications. It is desirable therefore to provide zoom lenses which produce a relatively wide field angle. For example, from approximately ±15° to ±30°, centered about the optical axis, using a minimum number of elements, which is thereby easier to assemble and align and produces less internal reflections, and may therefore be manufactured at lower cost than wide angle zoom lenses heretofore proposed, but without sacrificing lens performance and image quality.

It has been proposed to reduce the number of lens elements in a zoom lens through the use of refractive/diffractive hybrid lenses. One such proposal appears in U.S. Pat. No. 5,268,790 issued to C. W. Chen on Dec. 7, 1993. Zoom lenses having lens groups in which diffractive elements replace more complex refractive elements, such as cemented doublets, are the subject matter of a patent application filed in the name of Lee R. Estelle and Barbara J. Kouthoofd concurrently with this application and assigned to the same assignee as this application.

Such zoom lenses as have been proposed do not image over wide angles and are not suitable for photographic camera applications. In addition, they require 10 or more elements in order to reduce aberrations and obtain acceptable image quality. For further information concerning hybrid refractive diffractive lenses reference may be had to the above cited Chen patent and Estelle et al. application and, for example, to U.S. Pat. No. 5,013,133 issued to D. A. Buralli et al on May 7, 1991 and U.S. Pat. No. 5,078,513 issued to K. Spaulding et al. on Jan. 7, 1992 and to U.S. patent applications filed in the name of the inventor hereof, namely Ser. Nos. 08/174,737—Dec. 29, 1993, 08/175,708—Dec. 29, 1993, and 08/292,349—Aug. 17, 1994. The Buralli and Spaulding patents provide information as to the design of DOEs which are also known as kinoform or Fresnel zone plate lenses.

SUMMARY OF THE INVENTION

It is the principal object of the present invention to provide an improved zoom lens which has relatively few optical elements, for example, four refractive optical elements, and which provides performance comparable to zoom lenses having a greater number of elements.

It is a further object of the invention to provide an improved wide angle zoom lens which utilizes diffractive optics and obtains performance comparable to zoom lenses requiring more optical elements than are contained in the improved zoom lens.

It is a still further object of the present invention to provide an improved wide angle zoom lens especially suitable for photographic camera applications.

It is a still further object of the present invention to provide an improved wide angle zoom lens having groups of lenses, no one of which contain no more than two refractive elements where the groups move with respect to each other to provide focusing over a wide angle, for example about ±30° at the image or focal plane of the lens.

It is a still further object of the present invention to provide an improved multi-group zoom lens with a first group having a diffractive optical element disposed on a surface thereof facing the image side of the lens and spaced from an aperture stop which moves with the front or first group lens thereby reducing flare and scattered or undiffracted light and improving the image quality (especially image contrast-sharpness or resolution, as may be measured by MTF) of the improved zoom lens.

It is a still further object of the present invention to provide an improved wide angle zoom lens having a hybrid refractive/diffractive front group which faces the object which is imaged by the lens and which substantially corrects chromatic aberration over the zooming range without the need for substantial chromatic aberration correction in the other elements of the lens.

It is a still further object of the present invention to provide an improved zoom lens having a field flattener refractive element, which may be a generally plano concave singlet, as the final element of the lens which faces the image plane thereof so as to obtain wide angle coverage of the image plane.

It is a still further object of the present invention to provide a multi-group zoom lens wherein the ratio of displacement of a plurality of the movable groups of the lens is linear so as to enable these groups to be actuated by a single actuating element such as a motor and mechanical drive.

The invention is not limited to attainment of all of the foregoing objects and may be utilized to advantage in a zoom lens in which one or more of these objects is attained.

Briefly described, a zoom lens provided by the invention images an object over a sufficiently wide field angle at an image plane to substantially cover a frame at the image plane over a zoom range which may be a ratio of magnification or focal length of 2 to 1, and without substantial aberrations.

The lens utilizes first, second, and third lens groups which are movable with respect to each other and are disposed successively along an optical axis in a direction between the sides of the lens facing the object and the image plane, respectively. The first group contains only a hybrid refractive-diffractive positive singlet having curved surfaces on one of which a DOE is located. The second group has net positive power and contains only a meniscus element and a biconvex element. The meniscus element may be a plastic, low power element so as to be substantially unaffected by thermal expansion and contraction. The third group is a negative generally plano concave singlet with power sufficient to correct aberration over the wide field angle and over the zoom range.

BRIEF DESCRIPTION OF THE DRAWINGS

The foregoing and other objects, features and advantages of the invention as well as a presently preferred embodiment thereof will become more apparent from a reading of the following description in connection with the accompanying drawings:

FIG. 4A showing the MTF variation with spatial frequency (cycles/mm) and FIG. 4B illustrating the variation in MTF with distance from the optical axis which is at the 0.0 mm position on the plot. FIGS. 4A and 4B show MTF at the short focal length (35 mm end of the zooming range of the lens illustrated in FIGS. 1 and 2;

DETAILED DESCRIPTION

Figure 1:
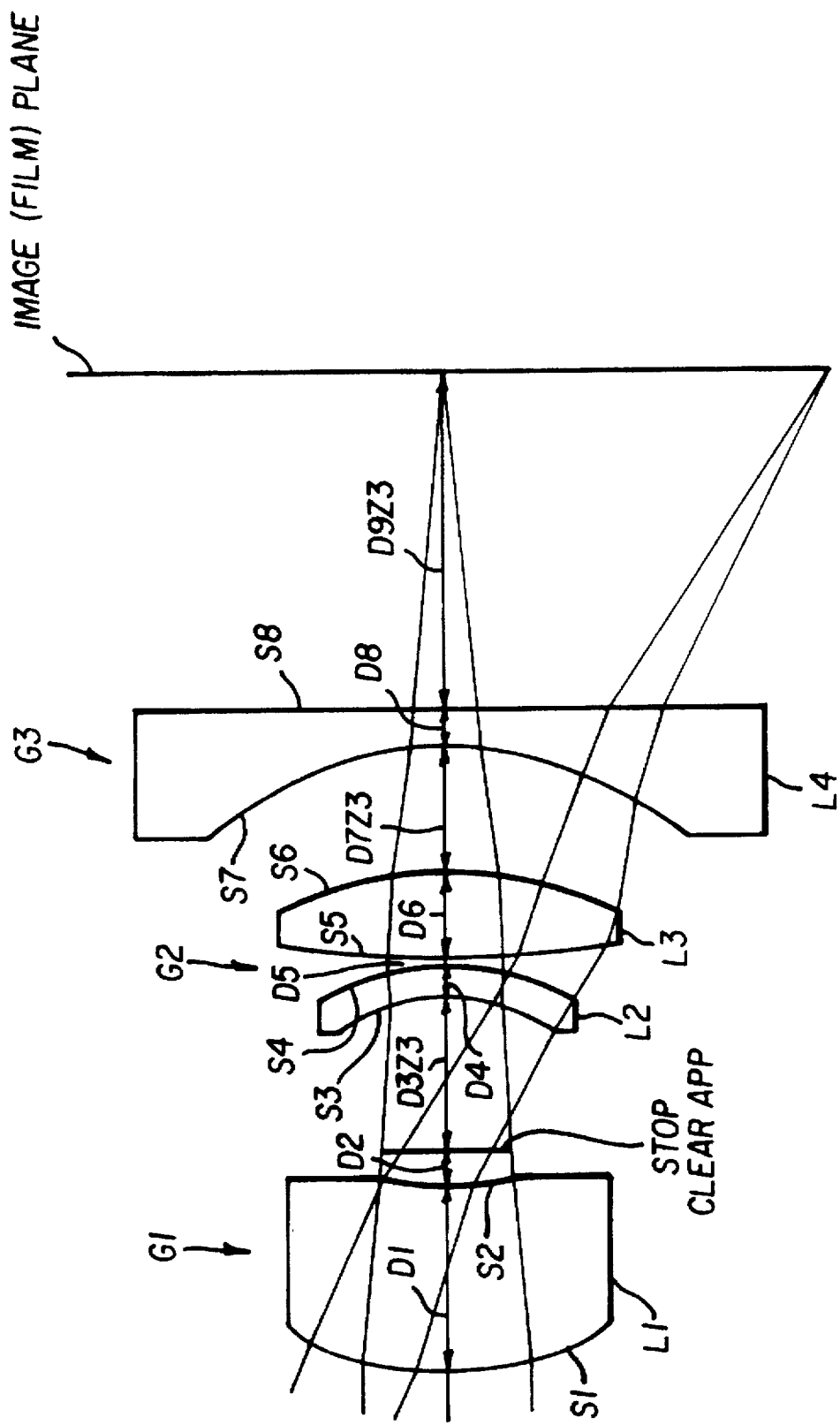
FIG. 1 is a schematic, ray diagram of a zoom lens embodying the invention at the middle of its zooming range.

As shown in FIG. 1 a zoom lens provided in accordance with the invention has a significantly reduced number of lens elements, namely only four refractive elements. The lens achieves a high level of image quality and performance comparable to lenses with far more elements (for example, 10 or 12) through the use of aspheric and diffractive surfaces on the lens elements which provide a wavefront shaping effect comparable to the multiplicity of refractive spherical elements used in conventional zoom lenses. Accordingly, the manufacturing cost of a zoom lens provided in accordance with the invention may be reduced due to the need for fewer parts and less stringent alignment and component tolerances than in conventional lenses. The illustrated zoom lens also obtains less flare and undiffracted light by virtue of fewer surfaces which may reflect and scatter and also by virtue of the location of an aperture stop immediately adjacent the surface of the front element, on which the DOE is provided, which blocks undiffracted light such undiffracted light might cause flare and scattering at other lens surfaces and even in the image plane which would affect adversely image quality, particularly contrast.

The lens illustrated in FIG. 1 has three lens groups, G1, G2, and G3. The first group G1 is a positive lens with a convex front surface S1 and a concave surface S2 on which annular zones of a blazed grating are provided. This curved surface is of approximately the same radial size as the clear opening in an aperture stop which is immediately adjacent to the surface S2. The aperture stop blocks undiffracted light and also much of the glare light.

The lens G1 is a hybrid refractive/diffractive lens. The front surface S1 is aspheric as are two other surfaces S4 and S8 which are on lenses L2 of a two element second group, G2, and a lens L4 on a single element third group, G3.

Figure 2:
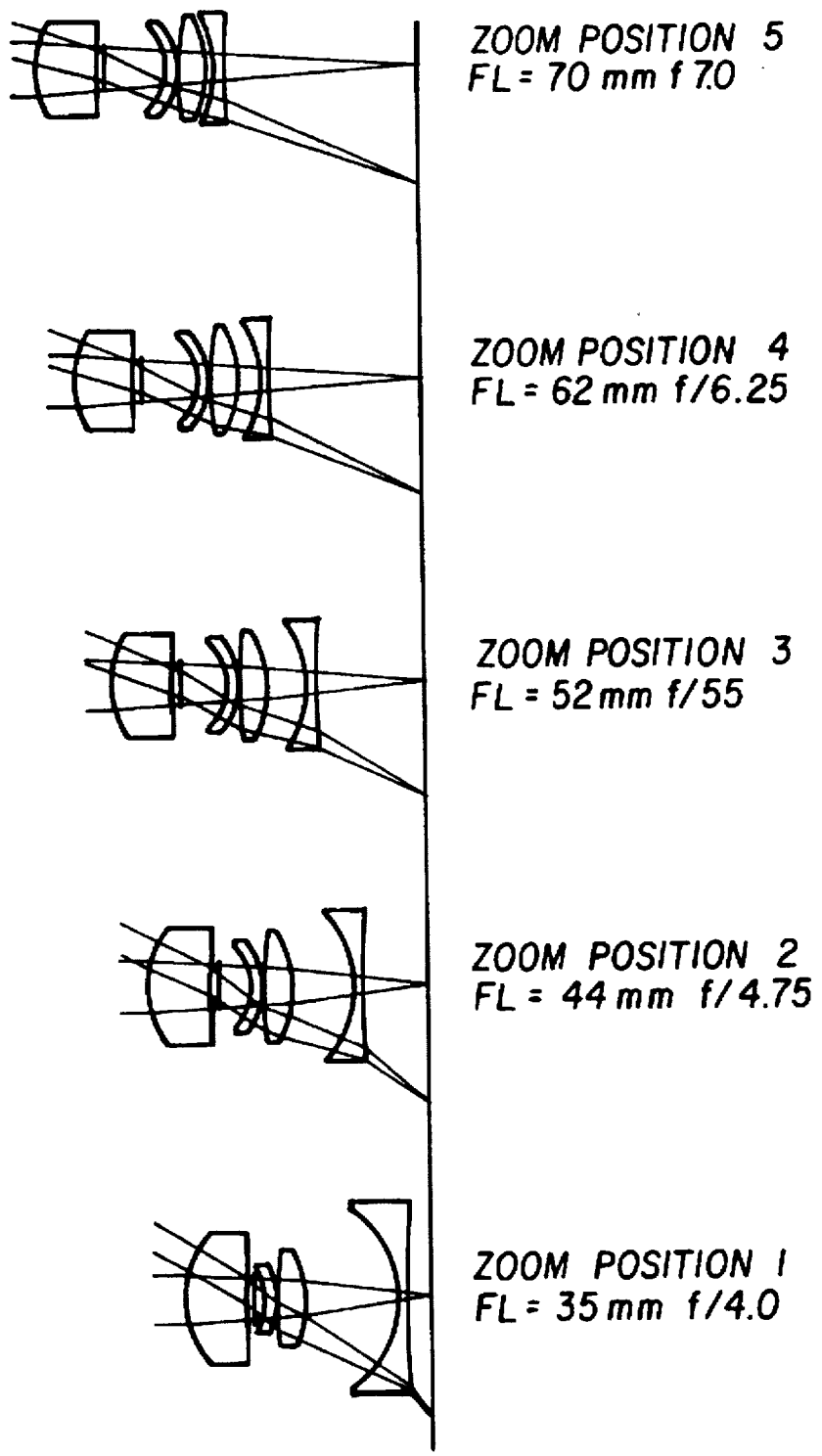
FIG. 2 is a chart illustrating the zoom lens shown in FIG. 1 in different positions over the zooming range thereof and depicting the focal length, the F/# and positions of the lens groups at each of five positions over the zooming range.

The first and second groups move inwardly toward each other from the short focal length zoom position to the long focal length zoom position 5, as is illustrated in FIG. 2. The second group moves from a position near the first group in zoom position 1 to a position near the third group in zoom position 5, again as shown in FIG. 2.

The second group, G2, has a negative plastic (preferably styrene) element 2 with high dispersion (low Abbe number). The back surface S4 of this negative, element is aspherical. The second group also includes an element L3 which is a spherical glass positive element. The negative element L2 acts as an aberration and color correction element for the second group G2. Since L2 is a meniscus shell, the total focal power of G2 is low and the power of L2 is especially low. Thus, the effect of thermally induced focal shifts, to which plastic materials are more subject than glass, is minimal even though a plastic element is used and enables cost reduction of the zoom lens provided in accordance with the invention.

The third group, G3 is a single element L4 which is a generally plano-concave singlet. It is of a glass having a lower dispersion than any of the other elements and therefore does not substantially effect chromatic aberration. Chromatic aberration is corrected primarily by the diffractive zone plate type lens (the DOE) on the curved surface S2. Some additional color correction is provided by the combination of L2 and L3. L4 is a field flattening element that reduces Petzval aberrations and allows the use of a flat image plane while preserving the MTF of the system even near the edge of the field. The surfaces except for the S2 diffractive surface maybe anti-reflection coated.

Figure 3:
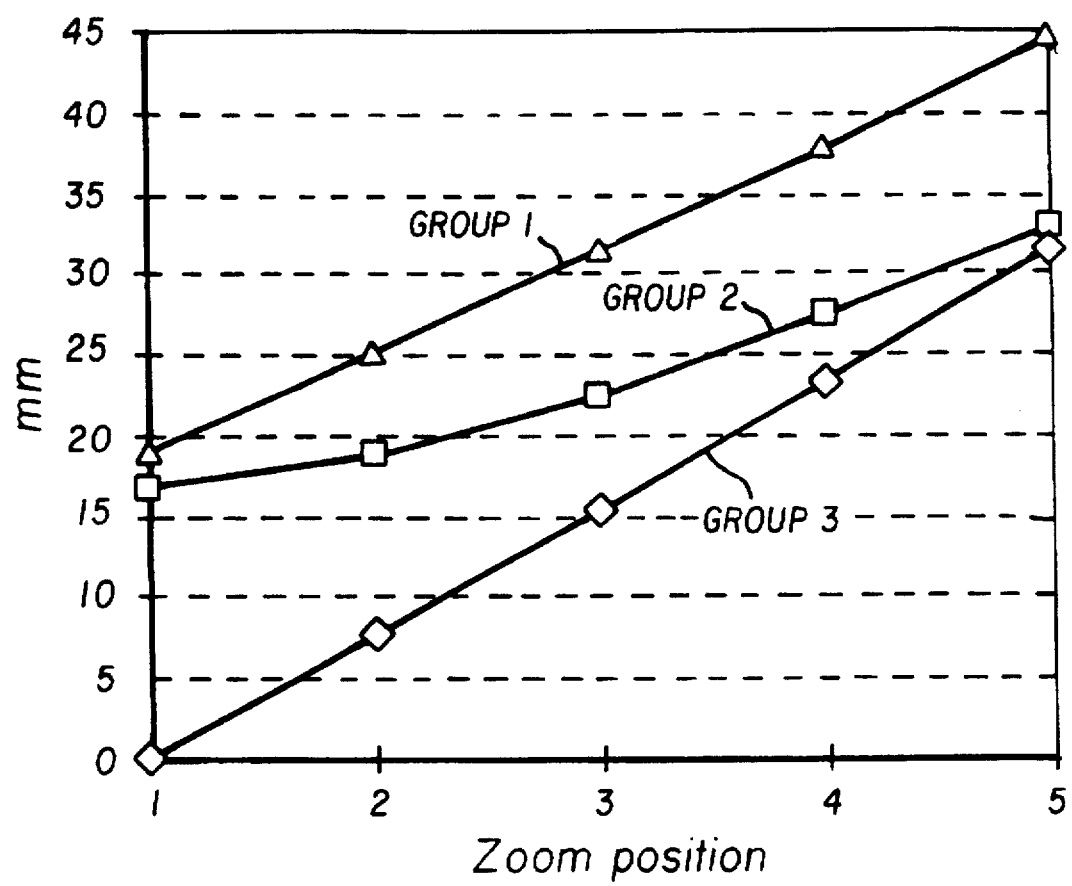
FIG. 3 is a plot showing the displacement of each of the elements of the zoom lens illustrated in FIG. 1 over the zooming range of the lens.
Figure 4B:
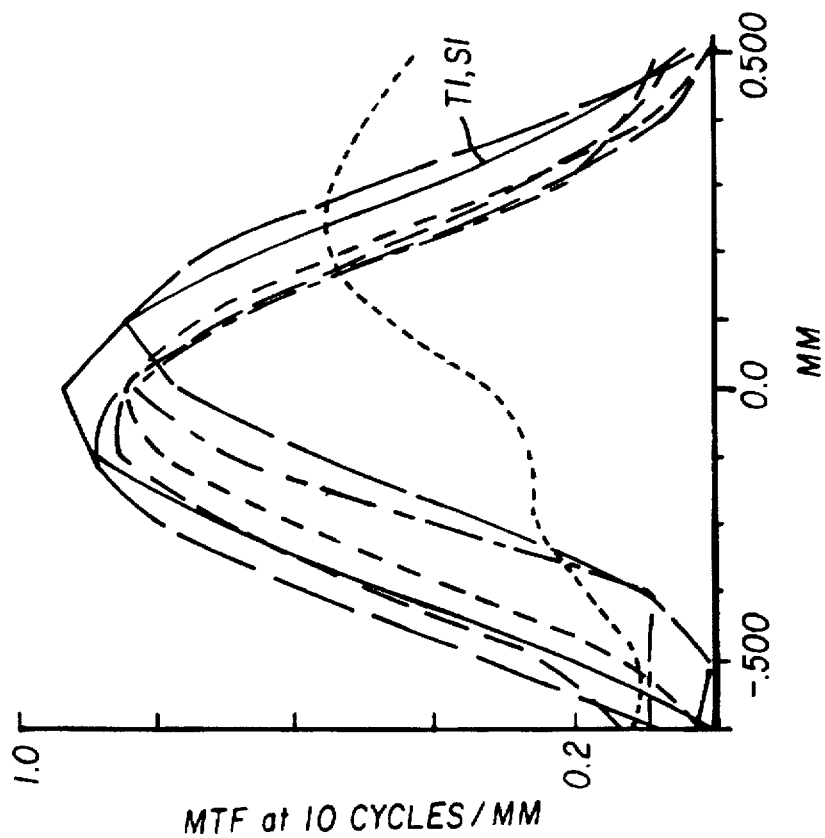
Figure 4A:
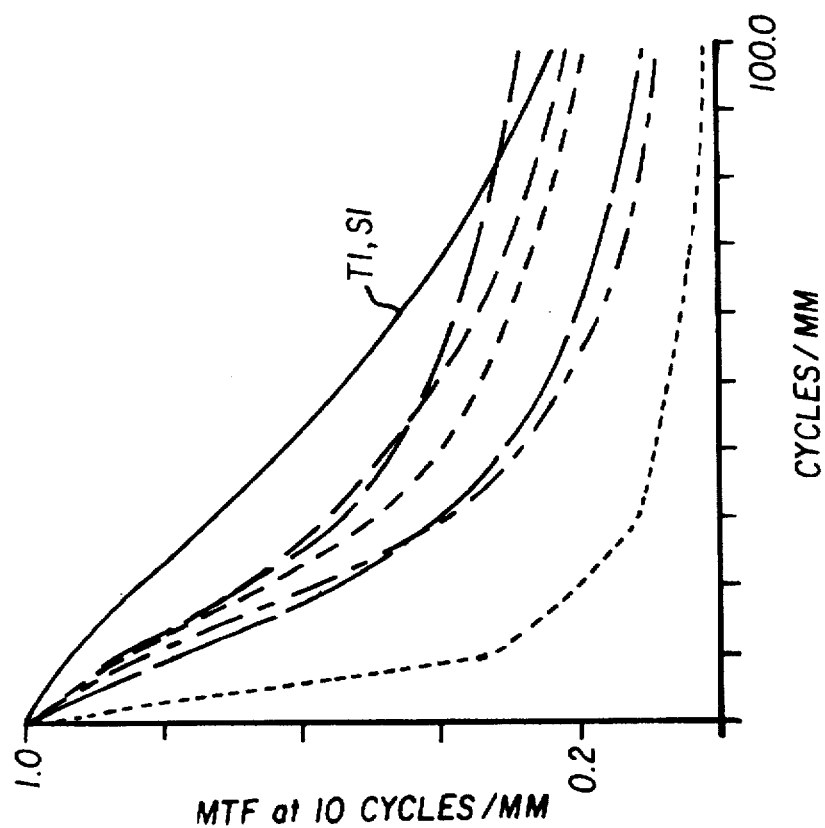
FIGS. 4A and B are MTF plots illustrating the performance of the lens shown in FIGS. 1 and 2 at different field positions successively spaced from the optical axis in the tangential or vertical direction and in the sagittal or horizontal direction across the field of view in the image plane.
Figure 5B:
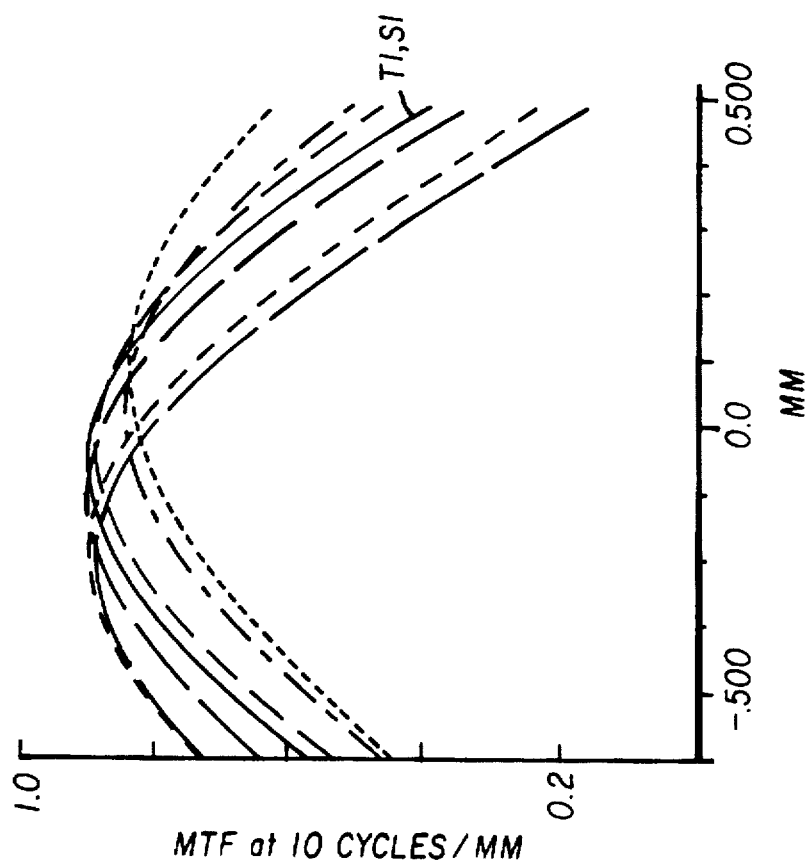
FIGS. 5A and 5B are plots similar to FIGS. 4A and 4B for the lens shown in FIG. 1 positioned at the far end of its zooming range.
Figure 5A:
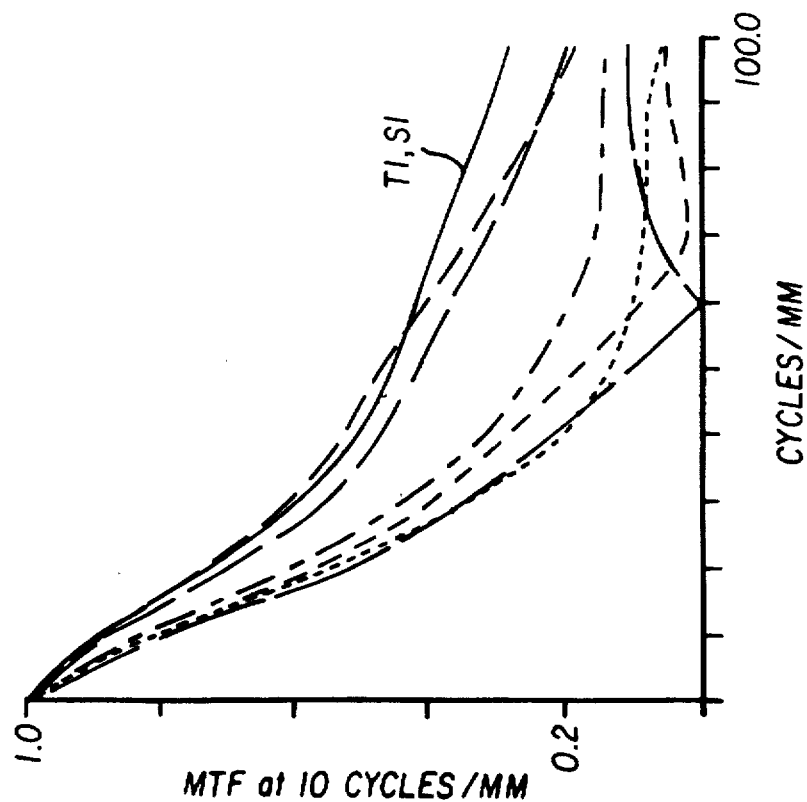
Figure 6B:
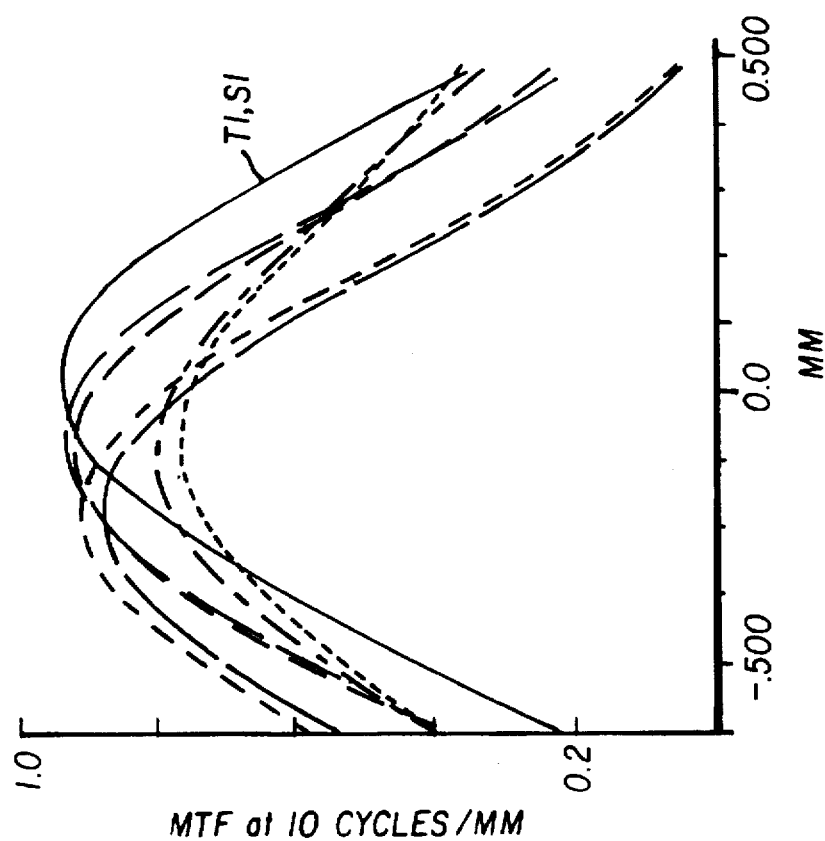
FIGS. 6A and 6B are plots similar to FIGS. 4A and 4B for the lens when positioned in the middle of its zooming range (52.5 mm).
Figure 6A:
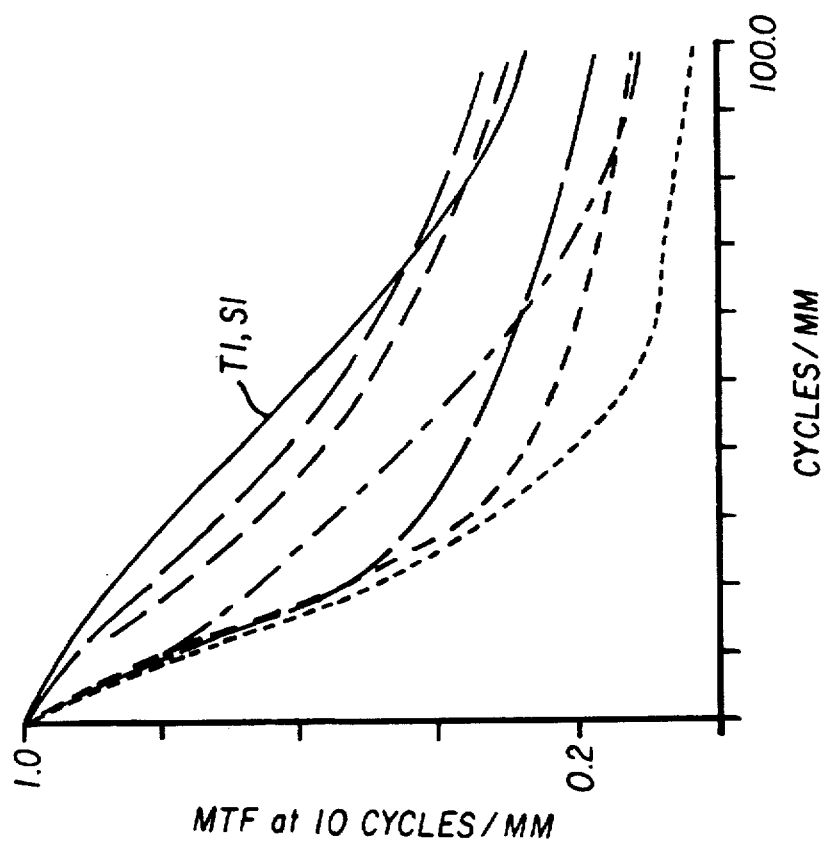

The powers of the lens elements and the spacing variations (D2, D3 and D7) are selected so that the displacement of G1 and G3 over the zooming range is linear as illustrated in FIG. 3. Accordingly, a single motor with a linear displacement control mechanism (a simple lever mechanism will be sufficient) provides the requisite zooming motion. The motion of the second group is a nonlinear function of the positions of the 1st and 3rd groups and can be generated via the use of a mechanical cam attached to the 1st or 3rd groups. The use of two motors, notwithstanding that three elements of the lens are movable provides additional cost reduction.

In the limit at the short focal length position 1, as shown in FIG. 2, the generally plano-concave surface S8 of L4 may be approximately 4 mm from the image (film) plane. S8 is also an aspherical surface. The three groups correct the monochromatic aberrations while the diffractive lens provides principal correction for chromatic aberration with the remaining chromatic aberration correction being provided by the lenses L2 and L3.

Table 1 presented below is a specific non-limiting example of a lens designed in accordance with the invention.

TABLE 1

| Surface | Radius | | Thickness | Glass | | |
|---------|--------|---|-----------|-------|---|---|
| 1 | 17.014021 | Asphere | 10.990291 | ZKN7 | 1.510452 | 61.42 |
| 2 | 22.581027 | Diffractive | | 2.000030 | AIR | |
| 3 | Infinity | | 0 | ASTOP | | |
| 4 | Infinity | | Zth 1 | AIR | | |
| 5 | −10.494886 | | 1.999689 | STYR. | 1.59452 | 31.16 |
| 6 | −12.628896 | Asphere | 0.250000 | AIR | | |
| 7 | 59.691599 | | 4.810409 | ZKN7 | 1.510452 | 61.42 |
| 8 | −20.350164 | | 0 | AIR | | |
| 9 | Infinity | | Zth 2 | AIR | | |
| 10 | −20.239879 | | 2.004251 | FK5 | 1.489147 | 70.45 |
| 11 | 144.080628 | Asphere | Zth 3 | AIR | | |
| 12 | Infinity | Image | | AIR | | |

| Aspheric Coefficients | | Srf 1 | 6 | 11 |
|---|---|---|---|---|
| AS2 | $r^4$ | −1.5668e-06 | 2.7538e-05 | −1.6954e-05 |
| AS3 | $r^6$ | −1.9163e-07 | −2.8872e-07 | 3.4995e-08 |
| AS4 | $r^8$ | 6.9399e-09 | 1.5159e-08 | 2.5422e-10 |
| AS5 | $r^{10}$ | −1.3651e-10 | −2.4898e-10 | −2.6943e-12 |
| AS6 | $r^{12}$ | 1.2381e-12 | 1.1492e-12 | 9.0212e-15 |
| AS7 | $r^{14}$ | −4.2711e-15 | 8.0442e-15 | −1.0003e-17 |

$$z(r) = \frac{cv^2 \cdot r^2}{1 + \sqrt{1 - cv^2 \cdot r^2}} \; [(AS2)r^4 + (AS3)r^6 + (AS4)r^8 + (AS5)r^{10} + (AS6)r^{12} + (AS7)r^{14}]$$

$$cv = 1/r = 1/17.014021$$

Diffractive Coefficient    Surface 2
Design $\lambda_1$    0.5461 μm
Diffraction Order    1
DF1    $r^2$    −0.000755

$$\phi(r) = 2 \frac{\pi}{\lambda_1} (-7.55 \times 10^{-4})$$

Wavelengths (μm)

| $\lambda_1$ | $\lambda_2$ | $\lambda_3$ | |
|---|---|---|---|
| 0.5461 | 0.4861 | 0.6563 | |

| Zth (mm) Zoom Position | SRF | 4 | 9 | 11 |
|---|---|---|---|---|
| 1 | 2.0000 | | 17.12251 | 0 |
| 2 | 6.2546 | | 11.44714 | 7.53281 |
| 3 | 8.8171 | | 7.35231 | 15.25136 |
| 4 | 10.4750 | | 4.22530 | 23.14770 |
| 5 | 11.7043 | | 1.76218 | 31.13767 |

Figure 7:
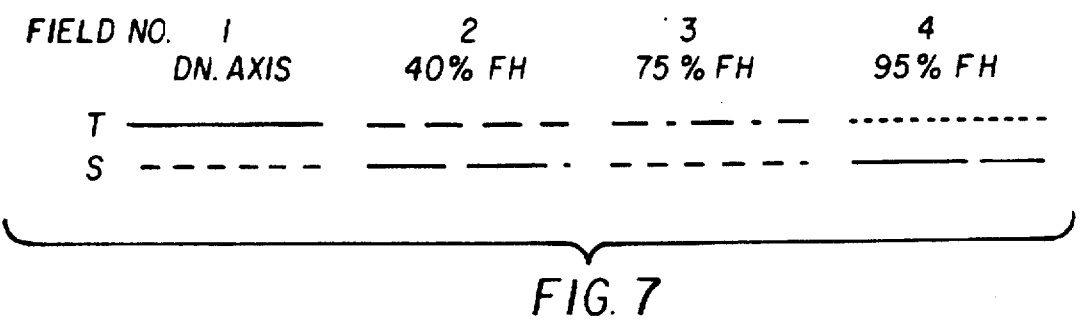
FIG. 7 is a chart identifying each curve of the family of curves in each of the plots of FIGS. 4A & B, 5A & B and 6A & B in terms of its location in the field as a percentage of distance to the sides of the field of view from the optical axis and for the tangential and sagittal directions, through the use of lines which are undashed or have dashes of different length.

FIGS. 4A through 6B when taken with FIG. 7 illustrate the MTF performance of the lens in the sagittal and tangential directions out to the edges of the field for the exemplary lens design shown in FIG. 1 and specified in Table 1. It will be seen that even in the worst case at the outer periphery of the frame (95% of the full field height (FH)), spacial frequencies of up to 60 cycles per millimeter can be resolved since only at that point does the MTF drop to zero.

Accordingly, there has been provided an improved zoom lens having a reduced number of lens element and increased alignment tolerance for reduced manufacturing costs and decreased flare and aberrations for improved MTF, which comes about through the inventive use of an achromatizing diffractive/refractive element. The MTF plots illustrate that the lens provided in accordance with the invention achieves a performance comparable to zoom lenses having more lens elements. Variations and modifications in the herein described zoom lens, within the scope of the invention, will undoubtedly suggest themselves to those skilled in the art. Accordingly, the foregoing description should be taken as illustrative and not in a limiting sense.

What is claimed is:

1. A zoom lens for imaging an object on an image plane over a range of field angles which vary over a zoom range of at least 2:1, wherein said lens has a plurality of lens groups at least one of which is movable with respect to the others, the improvement comprising:

(i) a lens located in the frontmost group of one of said lens groups, said lens being a hybrid refractive-diffractive positive singlet, and ii) a field flattening lens in the one of said lens groups which is most closely adjacent to said image plane for flattening the field imaged on said plane, said field flattening lens having a first concave surface facing away from said image plane and another surface with a larger radius of curvature than said first surface facing said image plane.

2. A zoom lens for imaging an object on an image plane over a range of field angles which vary over a zoom range of at least 2:1, wherein said lens has a plurality of lens groups at least one of which is movable with respect to the others, the improvement comprising a lens in the one of said groups which is most closely adjacent to said image plane for flattening the field imaged on said plane, said lens having a plano surface facing said image plane and a concave surface facing away from said image plane.

3. A zoom lens according to claim 2 wherein said field flattening lens is a singlet.

4. A zoom lens according to claim 3 wherein said field flattening lens is made from material having dispersion that is less than that of other lenses of said plurality of groups.

5. A zoom lens according to claim 4 wherein said material has an Abbe number greater than 60.

6. A zoom lens for imaging an object over a sufficiently wide field angle at an image plane to substantially cover a frame at an image plane over a zoom range of 2:1 without substantial aberrations, said lens comprising first, second and third lens groups which are movable with respect to each other and are disposed successively along an optical axis in a direction from between sides of said lens facing said object and said image plane, respectively, said first group containing only a hybrid refractive-diffractive positive singlet having curved surfaces on one of which a diffractive lens is located, said second group having net positive power and containing only a meniscus element and a bi-convex element, and said third group being a plano-concave singlet having negative power sufficient to correct aberration over said wide field angle over said zoom range.

7. The zoom lens according to claim 6 wherein said curved surfaces of said singlet of said first group including a concave surface facing said image plane, said diffractive surface being on said concave surface.

8. The zoom lens according to claim 6 wherein said diffractive lens is a blazed grating of annular lines around said axis which define annular zones of varying radial width.

9. The zoom lens according to claim 7 further comprising an aperture stop movable with said first group and spaced rearwardly toward said image plane behind said diffractive lens surface.

10. The zoom lens according to claim 6 wherein a surface on lens elements of said first, second and third groups is aspherical sufficiently to substantially correct spherical and off-axis aberrations at said image plane.

11. The zoom lens according to claim 10 wherein said surface of said first group element facing said object is a first of said aspherical surfaces, a surface of said meniscus which is convex being a second of said aspherical surface, and a surface of said piano concave element which is concave, being a third of said aspherical surfaces.

12. The zoom lens according to claim 6 wherein said meniscus is of plastic material and has a power less than the power of any other lens element in said zoom lens.

13. The zoom lens according to claim 6 wherein said plano concave third group element has a smaller dispersion than the elements of any of said first and second groups.

14. The zoom lens according to claim 13 wherein said plano concave element is of glass having an Abbe number greater than 60.

15. The zoom lens according to claim 6 wherein said first and third groups have a displacement with respect to one another which varies linearly over said zoom range.

16. The zoom lens according to claim 15 wherein said linearly varying displacement is such that the ratio of displacement of said first and third groups with respect to each other over said zoom range is substantially constant.

17. A zoom lens according to claim 15 wherein said field flattening lens is made from a material that has an Abbe number greater than 60.

18. A zoom lens for imaging an object over a sufficiently wide field angle at an image plane to substantially cover a frame at an image plane over a zoom range of 2:1 without substantial aberrations, said lens comprising first, second and third lens groups which are movable with respect to each other and are disposed successively along an optical axis in a direction from between sides of said lens facing said object and said image plane, respectively, said first group containing only a hybrid refractive-diffractive positive singlet having curved surfaces on one of which a diffractive lens is located, said second group having net positive power and containing only a meniscus element and a bi-convex element, and said third group being a singlet with a concave surface oriented towards said second group, said singlet of said third group having negative power sufficient to correct aberration over said wide field angle over said zoom range.

19. The zoom lens according to claim 18 further comprising an aperture stop movable with said first group and spaced rearwardly toward said image plane behind said diffractive lens surface.

20. The zoom lens according to claim 18 wherein a surface on lens elements of said first, second and third groups is aspherical sufficiently to substantially correct spherical and off-axis aberrations at said image plane.

21. The zoom lens according to claim 18 wherein said meniscus is of plastic material and has a power less than the power of any other lens element in said zoom lens.

22. The zoom lens according to claim 18 wherein said singlet of said third group element has a smaller dispersion than the elements of any of said first and second groups.

23. The zoom lens according to claim 22 wherein said plano concave element is of glass having an Abbe number greater than 60.

* * * * *

UNITED STATES PATENT AND TRADEMARK OFFICE
CERTIFICATE OF CORRECTION

Page 1 of 1

PATENT NO. : 5,731,914
APPLICATION NO. : 08/639652
DATED : March 24, 1998
INVENTOR(S) : Mark M. Meyers It is certified that error appears in the above-identified patent and that said Letters Patent is hereby corrected as shown below:

ON THE TITLE PAGE

Insert the following priority claim after INID Code (22):

-- Related U.S. Application Data

(60)  Provisional application No. 60/002,441, filed on Aug. 16, 1995. --

Signed and Sealed this
Twenty-fourth Day of December, 2013

Margaret A. Focarino
*Commissioner for Patents of the United States Patent and Trademark Office*